Feb. 7, 1939. C. WIEGAND 2,146,102
TIRE INFLATION CONTROL SYSTEM
Filed June 15, 1937 2 Sheets-Sheet 1

INVENTOR.
Carl Wiegand
BY Robert L. Rockwell
ATTORNEY

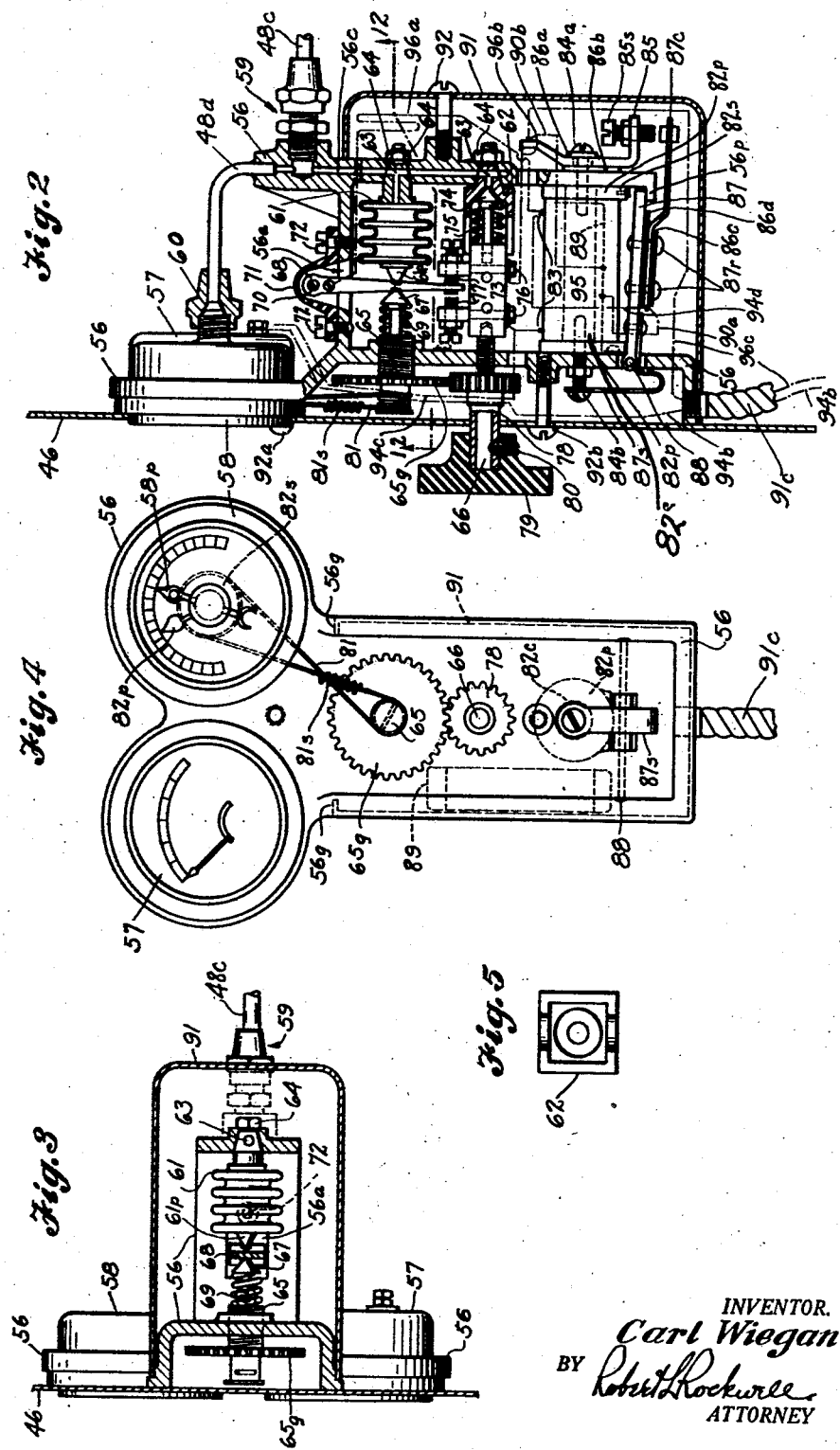

Patented Feb. 7, 1939

2,146,102

UNITED STATES PATENT OFFICE 2,146,102

TIRE INFLATION CONTROL SYSTEM

Carl Wiegand, Seattle, Wash.

Application June 15, 1937, Serial No. 148,422

10 Claims. (Cl. 230—15)

This invention relates to mechanism means for inflating pneumatic tires and more particularly to mechanism permanently associated with automotive vehicles for observing, maintaining and adjusting the fluid pressure of any or all of the tires while the vehicles are in motion.

In my invention several mechanism elements and the pneumatic tires of the vehicle are interconnected by means of tubing and electric wiring for the purpose of forcing a fluid, such as air, into or permitting it to escape from the several tires, and to control the air pressure therein either manually or automatically. A suitable gauge is used to indicate the air pressure in the system and connected tires at all times.

When an automotive vehicle is equipped with the system of my invention, in case the fluid pressure in the tires should decrease below the desired value due to a small puncture, slow leaks or the like, a pressure control device automatically connects a small air compressor to the engine, preferably by means of an electromagnet clutch, and air is forced thereby into the tires until the predetermined pressure is reached, then the pressure control device automatically disconnects the compressor.

A second instrument indicates when said compressor is in use, hence the duration and frequency of its use periods are indicative of the air-leak conditions of the tires or other parts of the system.

Whenever the tires become heated and the air therein expands, or for any other reason the air pressure increases above the desired value, a pressure operated relief valve automatically allows air to escape until the tire pressure falls to the desired value.

In cases where a lower tire pressure is wanted, as when leaving paving to traverse a less favorable stretch of road, the control device may be adjusted manually to an indicated desired lower value. This permits fluid to escape through the pressure relief valve until the lower pressure is obtained. When paving is again available the control device may be adjusted for the higher pressure, whereupon the air compressor is again connected to the engine until the higher pressure is had and it then is disconnected automatically as previously stated.

In like manner the air pressure in the tires may be increased or decreased for the heavier or lighter loading of trucks or for larger or smaller numbers of passengers carried by buses, thus assuring less chassis vibration, more comfortable riding qualities, and longer life for the tires.

In the event of a fluid leak in any tire or its connecting tubing, the same may be found by closing consecutively the readily accessible valves used to connect each of the several leads of the pneumatic system to the control device, until the last valve closed arrests the fall in pressure. The faulty lead then may be isolated from the balance of the system by closing its valve only and opening the others, or by opening it and closing the others. In the latter case the air compressor is made effective to maintain pressure in the faulty tire or its lead only.

The tires of all four wheels and the spare tire are normally interconnected by opening the several aforesaid valves so fluid pressure may be varied in all of them simultaneously. Then in case one of the tires is punctured, the air in all of the other tires and from the air compressor is available to retard the loss in pressure in the punctured tire. This often permits the vehicle to be driven to a shop where the faulty tire may be repaired or replaced with the spare, and is of particular importance on crowded highways, in stormy weather and for women drivers.

Well inflated tires often dig into soft earth and sand pockets when it is attempted to start the vehicle with the drive wheels in such formations. If the vehicle is equipped with my invention, the tire pressure easily may be reduced to the safe minimum so the car often can be extricated under its own power under such conditions. The pressure then may be readily increased to the normal value without inconvenience to the driver.

An object of the invention is to provide improved system means of the class described that is simple and compact in construction, easy to install and maintain, reliable in operation, and simple to manipulate.

Another object is to provide in said system combination manual and automatic pneumatic pressure control means associated with suitable indicating means to form a simple, compact, reliable and readily accessible unit for installation within the driver's sight and reach, preferably on the instrument board.

Other objects and advantages will be apparent to those skilled in the art from the following detailed description of a preferred form of the invention, which consists of certain parts and combination of parts, hereinafter described, illustrated in the accompanying drawings and embraced in the appended claims.

In the drawings:

Fig. 2 is a side elevation of the air pressure control device of the invention with a medial section through a portion of the frame and cover, and some of the other parts.

Fig. 3 is a sectional end elevation of the same on broken line 12—12 of Figure 2, with the pointer cable removed.

Fig. 4 is a front elevation of said device.

Fig. 5 is an end view of the removable relief valve seat and guide element of the aforesaid device to a larger scale.

Figure 1:
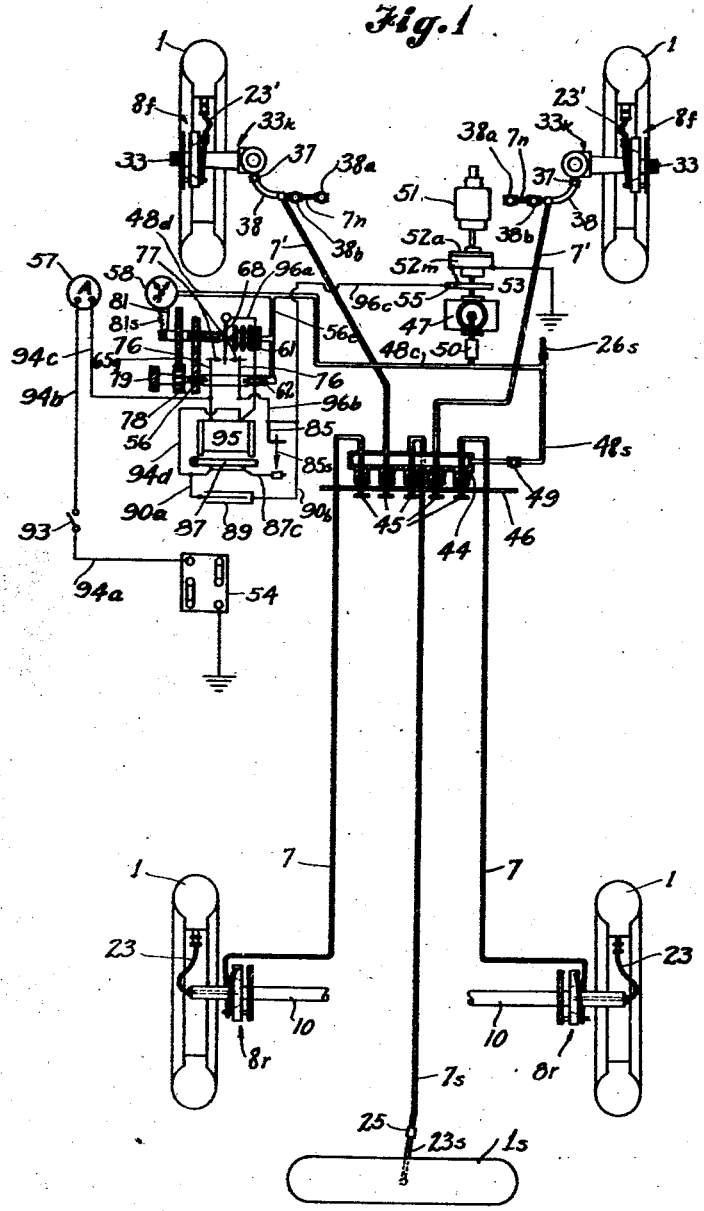
Figure 1 is a diagram indicating the relative positions of the several mechanism elements and pneumatic tires inter-connected by tubing and electric wiring embraced by the invention as applied to a conventional automotive vehicle.

Like reference numerals are used to indicate like parts throughout the drawings wherein 1 refers to the tire casings of an automotive vehicle equipped with my invention.

Referring to Figure 1, connection may be made between tubular conduit leads 7 of the tire pressure control system and the rear wheel tires by means of my rear wheel conduit lead rotary connectors 8r, preferably positioned within and near the outer ends of the rear axle housing; and likewise connection between conduit leads 7' and the front wheel tires may be made by means of my front wheel conduit lead rotary connectors 8f, preferably positioned within the hub housings of the front wheels. The aforesaid rotary connectors are illustrated and described in my Patent No. 2,090,089, granted August 17, 1937 on my application Serial No. 38,135, filed Aug. 27, 1935, of which this application is a continuation in part.

The fluid-flow conduit connection to each rear wheel is completed through a drilled hole indicated by the dotted lines in the outer end portion of its axle 10, and flexible tubing 23. Likewise said connection for each front wheel is completed through flexible tubing 38 terminating in connector fitting 37 screwed into a threaded duct, not shown, in front axle 33 of steering knuckle 33k, and flexible tubing 23'.

Vertically disposed nipples 7n, valves 38a and valves 38b, are adapted to facilitate replenishing the supply of oil used to lubricate rotary air lead connectors 8f, as explained in my aforesaid patent.

*Air pressure system*

A valve manifold consisting of a hollow body 44 in which a plurality of valve elements 45 are mounted, may be positioned behind the instrument panel 46 with the valve stems passing through apertures therefor in said panel so the knurled heads of said valve stems are within easy reach of the driver. A separate valve element may be provided for each tubular air lead connected to said manifold as shown in Figure 1. By means of the aforesaid valves the flow of air in rear wheel conduit leads 7, front wheel conduit leads 7' and conduit lead 7s to flexible tubing 23s and spare tire 1s can be controlled quickly and easily, so the facilities of the system may be utilized to the best advantage.

The manifold body chamber is connected to a source of fluid under pressure 47 through a run of tubing 48s containing a shut-off valve 49 and a check valve 50. When air brakes are not used, I prefer to employ an air compressor as my fluid supply means as shown in Figure 1. Connection is made also to the air pressure control device, hereinafter described, by means of tubing 48c. A modified tire valve and stem 26s may be provided in the run of tubing 48s to facilitate connection with service air leads for emergency inflation of the tires, testing or other purposes. Air compressor 47 may be driven by the projecting end of the shaft of the usual electric generator 51, which in turn is driven by the vehicle's engine, not shown.

To complete the driving connection between the compressor and generator shafts, I prefer to use an electromagnet clutch having an armature portion 52a and an electromagnet body portion 52m. One end of the winding of said clutch is "ground" to said body portion and through it to the frame of the vehicle, and the other end is connected to an insulated slip ring 53 fixedly mounted on the clutch shaft. The vehicle's metal frame (not shown) conducts the current from the "grounded" end of said winding to the "grounded" terminal of the usual storage battery 54, which may be charged by generator 51. Connection to slip ring 53 is made through brush 55.

It will be apparent that so long as the engine is running the air compressor may be started at any time by energizing the electromagnet clutch. Because of the high inductance of the clutch winding circuit, the current builds up slowly and the grip of the clutch is exerted gradually, thus enabling the air compressor to be started without undue jerk. Obviously the air compressor may be stopped by simply opening the electromagnet clutch circuit at any point.

*Fluid pressure control mechanism*

In order to exercise both automatic and manual control of the fluid pressure in the tires, I make use of the device illustrated in Figures 2, 3, 4 and 5, the diagrammatic electrical and conduit connections of which are shown in Figure 1.

The several elements to be used for fluid pressure control are mounted in cooperative relation in a frame 56 which may be an inexpensive die casting of non-magnetic material. One leg of said frame forms the base which is extended upwardly to provide two apertures into which current flow indicator 57 and pressure gauge 58 are pressed. The leg opposite said base is provided with a conduit 56c to which tubing 48c is joined by a standard connector fitting 59. A length of straight tubing 48d is inserted in the enlarged end of said conduit and secured to the frame by soldering or brazing, and is later bent as shown and connected to the pressure gauge by means of connector 60.

Tapered apertures are provided in the frame 56 to receive the tapered terminal of an accordion type of metal pressure cell 61, the movable head of which carries a conical point 61p of insulating material; and the tapered terminal of the valve seat and guide element 62 of the pressure relief valve. Each of the aforesaid elements has an aperture 63 that coincides with conduits 56c and in turn connects with an axial aperture leading to its operative portion, as shown clearly in Figure 2.

A length of straight rod of slightly smaller diameter may be passed through tube 48d (when straight) and inserted in said conduit and apertures 63 to assure their alignment and to serve as a holding tool while tightening nuts 64. After the tapered terminals are thus drawn firmly into their respective sockets, said rod may be removed and then tube 48d may be bent and connected to the pressure gauge as previously described.

Threaded apertures may be provided in the base leg of the frame in alignment with said tapered apertures to receive threaded spindle 65 and shaft 66. An axial aperture in said spindle is adapted to receive the shank of conical headed thrust pin 67 of insulating material such as Bakelite, the same being forced into operative engagement with pivotally supported contact member 68 by means of compression spring 69. The insulating conical point 61p of the pressure cell engages the opposite side of said contact arm, the pivotal support of which consists of pin 70 in a pivot block of insulating material 71 that covers aperture 56a and is removably secured to the top leg of frame 56 by means of screws 72.

It will be apparent to those skilled in the art that pressure cell 61 can expand and contract axially, and will exert a usable axial force proportional to the gauge pressure of the fluid within it; and that said pressure cell will compress spring 69 and move contact member 68 in one direction until said spring exerts an equal and opposite force. Likewise when the fluid pressure within expansive cell 61 decreases, compressed spring 69 will expand and move contact member 68 in the opposite direction until said spring exerts a force equal and opposite to that of the pressure cell.

Hence said contact arm will move in either direction from the normal vertical position in the direction of the greater of, and a distance proportional to the difference between, the opposing forces of said pressure cell and spring respectively, when either force is varied.

The inner end of threaded shaft 66 pivotally engages a recess in the end of a parallelopiped block of insulating material 73, the other end of which is held against rotational movement and guided for axial movement by the square aperture in the outer end of element 62. Said guided end of insulating block 73 is provided with an aperture to receive the shank of conical headed valve 74 which is forced against the valve seat of element 62 by means of compression spring 75.

A pair of contact posts 76 are fixedly supported by said insulating block, and contact screws 77 carrying lock nuts are adjustably positioned in said contact posts to receive and alternately engage the contacts of member 68. The slots shown in the guide portion of element 62 serve as apertures for the escape of air from the relief valve, and also prevent right contact post 76 and contact screw 77 from touching the metal of said element.

A sleeve and pinion element 78 is rotatively mounted on shaft 66 with the teeth of said pinion meshing with the teeth of a gear 65g fixedly secured to spindle 65. An adjustment knob 79 is adapted to fit on the end of the sleeve of element 78, and is secured thereto by means of set screw 80 which also is adapted to lock said sleeve to said shaft so the two will rotate together after the adjustments hereinafter described are made. The foregoing description explains in detail the construction of the preferred form of an important combination of corelated elements for my tire inflation control system, comprising an adjustable fluid pressure operated electric contactor having alternate contacts corelated with the adjustment mechanism of an adjustable fluid pressure operated relief valve. The coordinating adjustments for the combination are hereinafter explained.

The outer end of spindle 65 is provided with a hole through which a flexible cable 81 is passed, and then wrapped several times around said spindle and around a small sheave 82s carrying a pointer 82p, which may be pivotally mounted in a central aperture in the glass covering the face of pressure gauge 58, as shown in Figure 4, holes being provided in the case of said gauge for said cable. The slack in the aforesaid cable is taken up by spring 81s, which also permits the cable to expand and contract with changes in atmospheric conditions. It will be understood that the aforesaid pointer and sheave do not interfere with the usual operation of pointer 58p which is actuated by the gauge mechanism.

The final unit comprising the air pressure control device is preferably a built-in electric relay, the actuating element of which is an electromagnet having an iron core 82c and pole pieces 82p that form a bobbin on which the insulated wire of coil 95 is wound, the terminals thereof being indicated at 83 for the purpose of the wiring diagram. The design of the magnet winding is such that it will produce the required magnetic characteristics without undue heating when connected in series with the electromagnet clutch.

Said electromagnet may be removably secured between the base and opposite leg of frame 56 by means of screw 84a and a screw and nut combination 84b. Screw 84a also mechanically secures terminal 85 of the relay to frame 56, from which it is electrically insulated by means of pieces of insulating material 86a and 86b.

Relay armature 87 of magnetic material may have one end pivotally supported in an aperture in frame 56 on pin 88, its downward movement at the other end being limited by projection 56p of said frame. Both gravity and spring 87s are effective in urging said armature to the normal position illustrated, the force of said spring being adjustable by means of screw 84b, the nut on which serves to lock the screw and secure the end of the magnet to the base of the aforesaid frame. Contact spring 87c may be fixedly secured to said armature mechanically by means of rivets 87r and insulated therefrom electrically by pieces of insulating material 86c and 86d. A headed pin 82s of non-magnetic material may be used to prevent armature 87 from sticking to the pole piece due to residual magnetism. Contact screw 85s and the accompanying lock nut provide for any necessary adjustment of the main contacts of the relay.

The insulated conductors used to connect the several electrical parts of the air pressure control device are indicated diagrammatically for the sake of clearness by means of dot and dash lines, heavy dots being used to indicate preferred soldered terminal connections. Apertures may be provided in the base and opposite leg of frame 56 through which the conductors may be inserted to facilitate wiring the device at the factory, as shown in Figure 2.

A condenser 89 of suitable capacity to prevent excessive sparking at the relay contacts is fixedly secured mechanically to base 56, and electrically connected to said contacts by means of conductors 90a and 90b.

Grooves 56g are provided in frame 56 to receive inturned flanges of metal cover 91 which is removably secured to said frame by means of screw 92. It will be noted that this cover cooperates with the base portion of the frame to enclose and protect the principal control elements. A flexible conduit 91c may be used to protect the exterior electrical conductors 94b.

The preferred method of installing the air pressure control device is to provide apertures in metal instrument panel 46 to receive the face portions of instruments 57 and 58, the sleeve of element 78 and screws 92a and 92b. The device may then be positioned behind said panel and said screws screwed into threaded holes in the base of frame 56 to hold it firmly to the panel, as shown in Figure 2. When thus installed it will be apparent that the instrument panel and said base form a protective enclosure for gears 65g and 78, and other operative elements.

Adjustments

The device is adjusted at the normal air pressure for the tires of the vehicle. Assuming that said tires are inflated to said pressure, and that the calibration of gauge 58 is such that said pressure will be about one half of the full scale reading, pointer 58p will stand approximately vertical. The length and strength of spring 75 are made such that relief valve 74 is forced from its seat when the air pressure is increased the desired marginal amount, usually about ten percent of the normal pressure, and the center of the space between contact screws 77 is in vertical alignment with pivot pin 70 of contact member 68, knob 79 being used to turn threaded shaft 66 to secure this adjustment. Set screw 80 is then released so only sleeve and pinion element 78 and in turn spindle 65 respond when said knob is turned.

Likewise the length and strength of spring 69 are made such that contact member 68 is forced to the vertical position by pressure cell 61 for the aforesaid air pressure when pointer 82p coincides with the position of pointer 58p. Said screw 80 then is tightened so knob 79 will operate both screw shaft 66 and threaded spindle 65.

The desired permissible variation in the air pressure of the system above and below normal before contact member 68 engages either of contact screws 77 is had by changing said air pressure the desired amount and then adjusting the respective screws to just make contact.

Current for the operation of the electromagnet clutch is made available by closing switch 93. Since the air compressor is operative only when the engine is running, switch 93 may be and preferably is the switch for the usual ignition circuit.

Automatic control

Let it be assumed that both the air pressure of the system and the setting of the controls are at normal as would be indicated by the coincidence of pointers 58p and 82p at about the middle of the gauge scale. In case the air pressure of the system decreases for any reason below the permissible margin, the decreased air pressure permits spring 69 to force member 68 into electrical connection with right contact 77, as shown in Figure 2. If the engine is running and switch 93 is closed, the aforesaid electrical connection permits current to flow from battery 54 through conductor 94a, switch 93, conductor 94b, current flow indicator 57, conductor 94c, relay coil 95, conductor 96a, contact member 68, right contact 77 and post 76, conductors 96b and 96c, the winding of electromagnetic clutch 52m, the frame "ground" of the car and back to the negative terminal of battery 54.

This flow of current energizes the relay electromagnet which attracts armature 87 carrying contact spring 87c thus closing the relay contacts and completing a bridging circuit in parallel with the circuit that includes contact member 68 and right contact screw 77, thereby permitting current to flow from the terminal of coil 95 through conductor 94d, contact spring 87c, contact screw 85s and terminal 85 to conductor 96c.

By thus energizing the electromagnet clutch the driving connection is completed between the engine and air compressor, which pumps compressed air through check valve 50 into the air pressure system. With valves 49 and 45 in their normal open positions, the operation of the air compressor raises the air pressure in the tires until the pressure within cell 61 is sufficient to compress spring 69 enough to force lever 68 into contact with left contact screw 77. When said contact is made, a low resistance bridging path is established between the terminals of relay coil 95 through said contact elements and conductor 96a, thus greatly weakening the current in said relay coil and permitting armature 87 to fall and open the relay contacts, and these in turn interrupt the flow of current to the electromagnet clutch which disconnects the air compressor. Excessive sparking at said relay contacts is prevented by the use of condenser 89 as previously stated.

Obviously the foregoing cycle of operations is repeated when the air pressure again falls sufficiently to decrease the pressure in cell 61 so spring 69 can force member 68 into contact with right contact screw 77. Since the needle of the current indicator, or ammeter, 57 indicates when current flows to the electromagnet clutch that connects the air compressor to the engine, it will be apparent that it will also indicate the duration and frequency of the use of the air compressor which are indicative of the air leak conditions of the air pressure system.

Whenever the air pressure increases above the margin allowed for by the adjustments hereinbefore described, as when the air in the tires becomes heated due to use or to higher atmospheric temperature, pressure relief valve 74 is forced from its seat and sufficient air is allowed to escape to reduce the pressure to the value at which spring 75 can again force valve 74 back onto its seat. The slots shown in the guide portion of element 62 and the large length of loosely fitting edges of cover 91 permit the air to escape readily to the atmosphere.

Manual control

In cases where a lower tire pressure is wanted, as when about to traverse a length of rough road, or after the load on the vehicle is reduced, knob 79 is turned in a counter-clockwise direction until pointer 82p indicates the lower pressure desired, as illustrated in Figure 4 for example.

Since the threads are right hand on shaft 66 and left hand on spindle 65 both are retracted, but beceause of gears 78 and 65g and the proportions of springs 75 and 69 the pressure in cell 61 causes the end of member 68 to be retracted faster than the rate of retraction of left contact 77, with which it contacts, thus actuating the control mechanism to stop the compressor, if operating, as previously described. It will be apparent from the prior description that said retraction of shaft 66 weakens the force of spring 75 and permits air to escape until the air pressure in the system is reduced to the desired value indicated on the dial of gauge 58 by pointer 82p within the limits determined by the initial adjustments. At that time pointer 58p should be slightly past pointer 82p. The previously described automatic features of the device will then function as before in terms of the newly established lower pressure of reference indicated by pointer 82p.

To raise the tire pressure for travel on paved highways or for the transportation of heavier loads, knob 79 is turned in a clockwise direction until pointer 82p indicates the higher pressure desired. It will be apparent that the pressure then in cell 61 can compress spring 69 only a definite distance, hence advancing spindle 65 by turning said knob to the right simply compresses cell 61 and advances the contact end of member 68 faster than the rate of compression of spring 75. The result is that lever 68 is forced into contact with right screw 77, thus actuating the controls as previously described to start the air compressor, which continues to operate until the desired higher pressure is obtained and the pressure in cell 61 is sufficient to increase the compression of spring 69 until member 68 is forced into contact with left contact 77, thus actuating the controls to stop the compressor. As before, the automatic features of the device then are effective at the higher pressure of reference indicated by pointer 82p to maintain the pressure within the limits determined by the initial adjustments.

Although all of the tires are usually included actively in the controlled air pressure system, it will be apparent that by manipulating valves 45 various portions may be included or excluded, as previously explained, at the will of the driver. This often facilitates securing the desired result where it is necessary to manipulate the air pressure in certain of the tires.

Assuming, for example, that it is desired to reduce the air pressure in the rear tires in order to flatten and thereby increase the area of their treads in an attempt to extricate the vehicle from soft earth or sand, in which the rear wheels inadvertently have been stopped. This is done best by closing all of valves 45 except those connecting tubular leads 7 with manifold 44, and turning control knob 79 to lower the pressure, as previously explained. Obviously air will escape from the rear tires only until the desired pressure is reached. After extricating the vehicle, said control knob may be turned in the opposite direction to raise the pressure to the desired value for all of the tires, whereupon the air compressor is motivated to pump air into the rear tires only until said pressure is obtained, thus greatly reducing the time required for this special operation. The other valves 45 then may be opened and the system manipulated as before.

Shut off valve 49 may be used to retain the air in the tires in case of an air leak or trouble with any of the apparatus connected to run of tubing 48s that might permit air to escape from the tires.

While I have illustrated and described my system in a preferred form as applied to an automobile, it will be apparent to those skilled in the art that the combination of coacting elements constituting my invention may be adapted and applied to trucks of various kinds, busses, and other vehicles using pneumatic tires, and that various changes may be made in the details of construction and arrangement of parts without departing from the purpose and intent of said invention within the scope of the appended claims. For example, instead of using a compressor motivated by the engine driving the vehicle, any other means for supplying a suitable fluid under pressure may be used, such as a receiver containing compressed air that also may be used to operate the air brakes of the vehicle. The electromagnet clutch of the system would then be replaced by an electromagnet operated valve, which, like said electromagnet clutch, would be operable to effect air output into the system from said supply means. The other portions of the system would function as before without change.

Although air has been referred to as the fluid used to inflate the tires, it will be understood that any other suitable fluid may be used.

What I claim as new and desire to protect by Letters Patent is:

1. In a tire inflation control system, means for supplying fluid under pressure, a conduit lead having relatively stationary and revolving portions for connecting said supply means to a tire casing, a rotary air lead connector for operatively joining the relatively stationary and revolving portions of said conduit lead, other conduit means connecting the relatively stationary portion of said conduit lead with an adjustable fluid pressure operated electric contactor and with an adjustable fluid pressure relief valve, electromagnet means for controlling fluid output from said fluid supply means, a relay for controlling current flow to said electromagnet means, circuit means embracing the contacts of said contactor for controlling the operation of said relay, and means for simultaneously changing the adjustments of said relief valve and said contactor to control the escape of fluid from or the introduction of fluid into said tire casing.

2. In a tire inflation control system, means for supplying fluid under pressure, conduit means connecting said fluid supply means with a tire casing and with an adjustable fluid pressure operated electric contactor having alternate contacts, conductor means embracing in series circuit combination a source of electric current, the winding and contacts of a relay and the winding of electromagnet means to effect fluid output from said fluid supply means, electric circuit means for bridging the contacts of said relay with one set of contacts of said electric contactor to close said relay contacts and operate said electromagnet means, and electric circuit means for bridging the winding of said relay with the other set of contacts of said contactor for opening said relay contacts.

3. In a tire inflation control system, means for supplying fluid under pressure, conduit means connecting said fluid supply means with a tire casing and with an expansive pressure cell exerting a usable force, resilient means exerting a force adapted to oppose and balance said usable force, electromagnet means operable to effect fluid output from said supply means, a source of electric current, a relay having a winding and a pair of contacts in series circuit combination with said source and said electromagnet means; a movable contact member electrically connected to said series circuit combination between said relay winding and the adjoining relay contact, and adapted to be moved by said resilient means into connection with a relatively stationary contact connected to the other said relay contact thus energizing said relay winding to close said relay contacts and energize said electromagnet means when fluid pressure in said tire falls below a predetermined value, and adapted also to be moved by said pressure cell into connection with another relatively stationary contact so connected electrically to said series circuit combination as to bridge said relay winding to open said relay contacts and de-energize said electromagnet means when fluid pressure in said tire exceeds a predetermined value.

4. In a tire inflation control system, means for supplying fluid under pressure; conduit means connecting said fluid supply means with a tire casing, with an adjustable fluid pressure operated electric contactor and with an adjustable fluid pressure relief valve; electromagnet means for controlling fluid output from said fluid supply means, a source of electric current, a relay for controlling current flow from said source to said electromagnet means, circuit means embracing the contacts of said contactor for controlling the operation of said relay, and means for simultaneously changing the adjustments of said relief valve and of said contactor to control the escape of fluid from or the introduction of fluid into said tire casing.

5. In a tire inflation control system, means for supplying fluid under pressure; conduit means connecting said fluid supply means with a tire casing, with an adjustable fluid pressure operated electric contactor having alternate contacts and with an adjustable fluid pressure relief valve; electrical means embracing in series circuit combination a source of electric current, the winding and contacts of a relay and the winding of electromagnet means controlling fluid output from said fluid supply means; other electrical means for controlling the operation of said relay by closing the alternate contacts of said contactor, and means for simultaneously changing the adjustments of said relief valve and of said contactor to control the escape of fluid from or the introduction of fluid into said tire casing.

6. In a tire inflation control system, means for supplying fluid under pressure; conduit means connecting said fluid supply means with a tire casing, with a fluid pressure indicator having a dial and pointer, with an adjustable fluid pressure operated electric contactor having alternate contacts, and with an adjustable fluid pressure relief valve; electromagnet means for controlling fluid output from said fluid supply means, a relay for controlling current flow to said electromagnet means, circuit means embracing the alternate contacts of said contactor for controlling the operation of said relay, adjustment means for simultaneously changing the adjustments of said relief valve and of said contactor to control the escape of fluid from or the introduction of fluid into said system, and pointer means associated with the dial and pointer of said pressure indicator and actuated by said adjustment means for indicating the change in fluid pressure of the system corresponding to a change in said adjustment means.

7. In a tire inflation control system, means for supplying fluid under pressure; conduit means connecting said fluid supply means with a plurality of tire casings, with an adjustable fluid pressure operated electric contactor and with an adjustable fluid pressure relief valve; valve means for isolating a said tire casing from the balance of said connecting conduit means, a source of electric current, electromagnet means for controlling fluid output from said fluid supply means, a relay for controlling current flow from said source to said electromagnet means, electrical means connecting said source and relay and electromagnet means and embracing the contacts of said contactor for controlling the operation of said relay, and means for simultaneously changing the adjustments of said relief valve and said contactor to control the escape of fluid from or the introduction of fluid into said tire casings.

8. In a tire inflation control system, means for supplying fluid under pressure, conduit means connecting said fluid supply means with a tire casing and with an expansive pressure cell, adjustable resilient means exerting a force opposing and balancing that produced by said pressure cell, a relatively stationary contact adjustable simultaneously with said resilient means for a desired fluid pressure in said tire casing, movable contact means adapted to be moved by said resilient means to close with said stationary contact when there is less than said desired fluid pressure in the tire casing, electromagnet means operable to effect fluid output from said supply means, a source of electric current, and electrical means for connecting said source with said electromagnet means when said movable contact closes with said stationary contact.

9. In a tire inflation control system, means for supplying fluid under pressure, conduit means connecting said fluid supply means with a tire casing and with an expansive pressure cell, adjustable resilient means exerting a force opposing and balancing that produced by said pressure cell, a relatively stationary contact adjustable simultaneously with said resilient means for a desired fluid pressure in said tire casing, movable contact means adapted to be moved by said pressure cell into connection with said stationary contact when there is more than said desired fluid pressure in the tire casing, a source of current connected to electromagnet means operable to effect fluid output from said supply means, and electrical means for disconnecting said source from said electromagnet means when said movable contact closes with said stationary contact.

10. In a tire inflation control system, means for supplying fluid under pressure; conduit means connecting said fluid supply means with a tire casing, with a spring loaded relief valve, and with an expansive pressure cell; adjustable resilient means exerting a force opposing and balancing that produced by said pressure cell, a pair of relatively stationary contacts adjustable concurrently with the spring of said relief valve, movable contact means intermediate of the movable end of said pressure cell and of the adjacent portion of said resilient means and adapted to close alternately with said stationary contacts, electromagnet means operable to effect fluid output from said supply means, a source of electric current, electrical means for connecting said source with said electromagnet means when said movable contact closes with one of said stationary contacts and for disconnecting said electromagnet means when said movable contact closes with the other said stationary contact, and means for simultaneously changing the adjustments of said relatively stationary contacts and relief valve spring and of said resilient means to control the escape of fluid from or the introduction of fluid into said tire.

CARL WIEGAND.